Patented Nov. 22, 1932

1,888,922

UNITED STATES PATENT OFFICE

HERMAN L. HARTENSTEIN, OF CHICAGO, ILLINOIS

MANUFACTURE OF FERTILIZER

No Drawing. Original application filed October 18, 1926, Serial No. 142,192. Divided and this application filed April 4, 1927. Serial No. 180,997.

This application is a division of my original application Serial Number 142,192.

It is one of the objects of the present invention to produce manure or fertilizer without extracting or separating the plant food from the peat or muck which is used as a base in the present method.

Acidity is a condition of or common to many types of peat in the bog or swamp, due to the presence of carbon dioxide and colloidal substances of an acid character.

Heretofore in former processes the use of sulphuric acid has been necessary in order to produce ammonium sulfate from by-product peat gas, and the production of one ton of ammonium sulphate requires approximately one ton of sulphuric acid, with the result that the cost of the acid is a very important item of manufacture.

The present invention further contemplates the use of muck or peat, as in many sections in its native state it contains large quantities of carbonic acid frequently in excess of 3%, and also contains humus or organic matter which carries with it a large percentage of nitrogen, usually running from 2% to 4%, as well as hydrogen, approximately from 3% to 5%, and adding thereto or mixing therewith certain forms of metallic or pyrophorical iron, aluminum nitride, or the like, and titanium compounds combined with nitrogen, either with or without carbon, in the presence of nitrogen, hydrogen and acids, and digesting the mixture with sulphur oxide gases and aging the mass for a short period of time.

Aluminum nitride can be produced with but one-half of the electrical energy required to form calcium carbide or cyanamide, but up to the present time it has had no commercial value for fertilizer purposes, as the soil appears to be unable to transform the nitrogen of the aluminum nitride into fixed ammonia. In fact the nitride is too quickly decomposed by the moist soil, most of the ammonia liberated passes off into the air resulting in a fertilizer loss.

The nitrides are first decomposed by the moisture and organic matter of the peat, and by reason of the presence of calcium sulfate (gypsum), which is introduced before the ammonia ($NH_3$) from the nitrides has evolved, the ammonia is first absorbed by the water and then enters into direct combination with the calcium sulfate; or the fumes of burning or oxidized sulphur or pyrites, or sulphur mixed and burned with moist peat may be added to the mass, in lieu of the calcium sulfate to produce the fertilizer.

The present invention further contemplates putting in an available form the nitrogen content of peat or muck which has heretofore been unavailable, and adding thereto nitrogen in the form of aluminum nitride.

A further object is to provide an improved method of this character embodying the introduction of pyrophoric iron, which is more particularly described and claimed in my co-pending application, Serial No. 142,190, which has matured to Patent No. 1,819,164, dated Aug. 18, 1931.

A still further and a most important object of this invention is to take advantage of and employ the large quantity of water present in peat or muck to good and useful purposes in an economical and efficient manner at a minimum cost, in the natural or native state of the material, the presence of such quantity of water being heretofore held to be useless and detrimental in the former processes for the utilizing of muck or peat.

In carrying this invention into operation the preferred method is preferably carried out in substantially the following manner.

The first step in the method is preferably the introduction or mixing of the iron, pyrophoric iron, aluminum nitride, and titanium nitride with the peat or muck together with a small quantity of sodium nitrate which may be accomplished, in the best, cheapest and simplest suitable manner.

The muck or peat is employed in this improved method on account of its availability and vast quantities, the great water holding and retaining properties thereof as well as the presence of the humus compounds, organic matter and nitrogen, hydrogen and acids in the peat or muck.

As plants require sulphur in the form of sulfates, it is understood that if after treatment there be any sulfite or sulfide compounds present the transformation of these compounds into sulfates is of vital importance in order to feed the crops.

The compound may be then dried and ground in any suitable manner after which it is then ready for use.

This may be accomplished preferably as follows. The above resultant product containing the proper moisture content which is approximately one-half or two-thirds of the amount it will hold without noticeable dripping or draining, and at the increased temperature generated by the chemical reactions in the mass, preferably a temperature of from 95° to 105° F., is deposited in a suitable bin or receptacle, reasonably compacted, the bottom of the bin having means for admitting air in order to furnish the required aeration or oxygen. The moisture should not exceed two-thirds saturation, and the mixture should be compacted, and then allowed to stand usually from one to four weeks, but the period may be extended without harmful results. If no potassium bearing material has been used, a small amount of limestone or pulverized phosphate rock may be added, but this is not essential unless there is an excess of acid present, or a small amount of the pyrophoric iron may be added.

This improved method or process may be briefly stated to be as follows.

Dredge, shovel or pump the peat from the bog, place in a suitable container, and preferably add some sodium nitrate and the aluminum nitride. The proportions or quantities of sodium nitrate and aluminum nitride vary somewhat with the quality and condition of the muck or peat used; however, on a pile dry basis I prefer to use 2000 pounds of muck or peat, 1000 pounds aluminum nitride and 100 pounds of sodium nitrate.

In very cold sections or weather, means should be provided to warm the air to furnish the nitrogen and oxygen required. In hot dry summer weather merely by blowing air through is sufficient. The finished product may be removed from the bin in any suitable manner such as with a steam shovel, then preferably properly dried and pulverized.

The sulphur residuum, if any, left in the product is not harmful to vegetation, but is helpful to many soils inasmuch as there is an insufficiency thereof, owing to the action of humus or vegetable matter undergoing changes or combinations of a chemical and physical nature in the soil.

The phosphate rock enters into chemical combination with the acidulated sulphur gases held in the mixture and is made available for agricultural purposes.

In the present improved process or method the nitride of aluminum compounds containing nitrogen when introduced is decomposed by the combined action of the water and the acidulous humate compounds contained in the peat or muck.

The aluminum nitride and titanium compounds may be produced by means of the apparatus shown in my Patents Numbers 819,224; 883,110; 888,610; 946,434; and 946,435, all of which apparatus have continued in practical manufacturing operation up to the present time.

A concrete example of carrying out this invention briefly stated is as follows.

There is mixed with the muck or peat in its natural state the pyrophoric iron, a potassium fertilizer substance, aluminum nitride, calcium sulphate and a small quantity of nitrate of soda.

If desired phosphate rock may also be added.

The mixture is then thoroughly digested with sulphur oxide gases, and the mass is then allowed to stand or age for a period of at least ten days.

What is claimed as new is:—

1. A method for manufacturing a fertilizer from a material of the group consisting of peat and muck in their natural wet state which comprises adding to said material a potassium fertilizer substance, sodium nitrate, $CaSO_4$, phosphate rock, aluminum nitride and pyrophoric iron, digesting said mixture with sulphur oxide gases and ageing said mass for a period of at least ten days.

2. A method for manufacturing a fertilizer from a material of the group consisting of peat and muck in their natural wet state which comprises adding to said material sodium nitrate, phosphate rock, aluminum nitride, digesting said mixture with sulphur oxide gases and ageing said mass for a period of at least ten days.

3. A method for manufacturing a fertilizer from a material of the group consisting of peat and muck in their natural wet state which comprises adding to said material a potassium fertilizer substance, sodium nitrate, $CaSO_4$, phosphate rock, aluminum nitride, digesting said mixture with sulphur oxide gases and ageing said mass for a period of at least ten days.

4. A method for manufacturing a fertilizer from a material of the group consisting of peat and muck in their natural wet state which comprises adding to said material sodium nitrate, $CaSO_4$, phosphate rock, aluminum nitride and pyrophoric iron, digesting said mixture with sulphur oxide gases and ageing said mass for a period of at least ten days.

5. A method for manufacturing a fertilizer from a material of the group consisting of peat and muck in their natural wet state which comprises adding to said material a potassium fertilizer substance, $CaSO_4$, phosphate rock, aluminum nitride and pyrophoric iron, digesting said mixture with sulphur oxide gases and ageing said mass for a period of at least ten days.

In testimony whereof I have signed my name to this specification, on this 18th day of March, A. D. 1927.

HERMAN L. HARTENSTEIN.